Patented Feb. 5, 1952

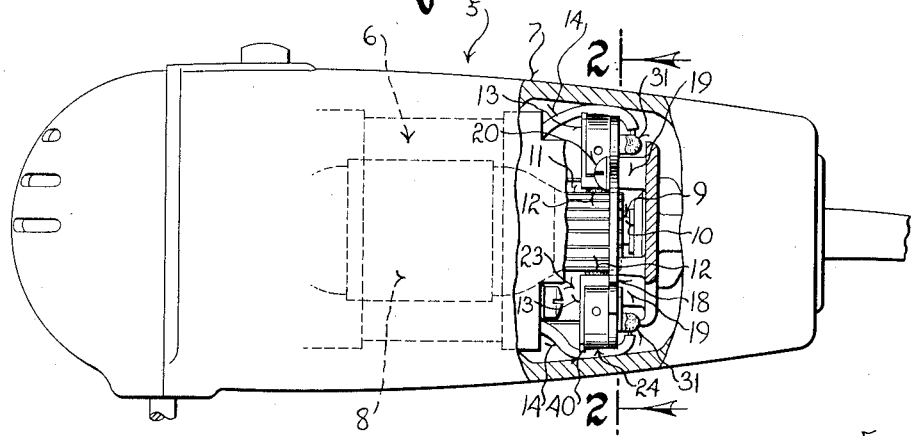
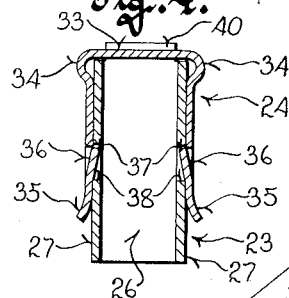
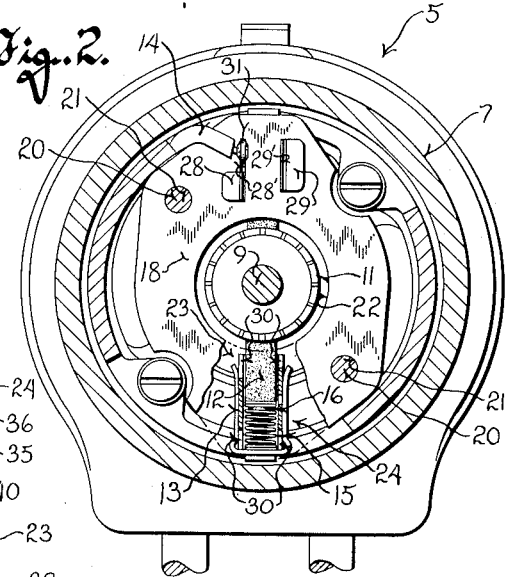
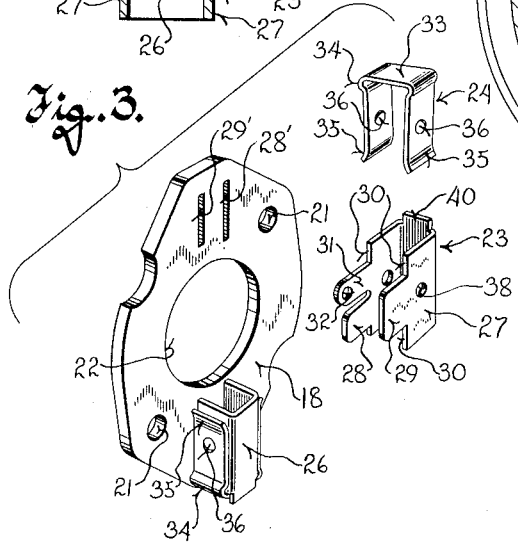

2,584,214

UNITED STATES PATENT OFFICE 2,584,214

BRUSH HOLDER FOR ELECTRIC MOTORS AND THE LIKE

William Paul Luther and George Rudat, Racine, Wis., assignors to John Oster Manufacturing Company, Racine, Wis., a corporation of Wisconsin Application June 16, 1950, Serial No. 168,608

3 Claims. (Cl. 171—324)

1

This invention relates to electrical machinery, and refers more particularly to brush holders for small electric motors, generators and the like.

It is an object of this invention to provide an unusually simple and inexpensive brush holder for electric motors and similar electrical apparatus, which brush holder may be readily manufactured from a few simple stampings and may be quickly assembled, even by inexperienced labor, without the need for special tools.

Another object of this invention resides in the provision of a novel cap for closing the anti-commutator end of a tubular brush holder of the character described, said cap being provided with a unidirectional detent-like latch to lock it in place on the holder while enabling it to be installed on the holder tube by the simple expedient of sliding it into place.

In this connection, it is another object of this invention to provide a cap for the anti-commutator end of a brush holder tube which cap is secured to the tube by means of a unidirectional detent-like latch capable of resisting outward displacement in consequence to bias of the brush spring or extraneous forces, but which is nevertheless readily removable to permit access to the interior of the tube for removal of the brushes for repair or replacement thereof.

With the above and other objects in view, which will appear as the description proceeds, this invention resides in the novel construction, combination and arrangement of parts substantially as hereinafter described and more particularly defined by the appended claims, it being understood that such changes in the precise embodiment of the hereindisclosed invention may be made as come within the scope of the claims.

The accompanying drawing illustrates one complete example of the physical embodiment of the invention constructed according to the best mode so far devised for the practical application of the principles thereof, and in which:

Figure 1 is a side elevational view of an electrical appliance powered by a small electric motor equipped with the brush holder of this invention, a portion of the motor housing being cut away to show the brush holder;

Figure 2 is a cross sectional view taken on the plane of the line 2—2 in Figure 1;

Figure 3 is a group perspective view of the several components of the brush mount of this invention, one of the brush receptacles being shown separated from the insulative mounting plate on which it is mounted and the cap for said receptacle being shown disconnected therefrom; and

2

Figure 4 is a longitudinal sectional view through a brush holder of this invention.

Referring now more particularly to the accompanying drawings, in which like numerals designate like parts throughout the several views, the numeral 5 designates generally an electrical appliance (in this instance, by way of example, a palm-grasped kitchen mixer) powered by a fractional horsepower electric motor, designated generally by 6, which is of the universal (A. C.-D. C.) type, and is completely enclosed by a housing 7.

As is customary, the rotary member of the motor comprises an armature 8 mounted on a shaft 9 which is journaled in bearings 10 at the ends of the housing; and a conductive segmented commutator 11, coaxial with the armature and rotatable therewith, which conducts current from brushes 12 to the coils (not shown) of the armature. Since the inner ends of the brushes have relative sliding contact with the commutator as the latter revolves, the brushes are endwise slidably mounted in substantially tubular brush holders 13, which also serve to carry current from conductors 14 to the brushes; and each of the brushes is biased inwardly toward the commutator by means of a coiled compression spring 15 which reacts between the anti-commutator end of the brush holder and the corresponding outer end of the brush to at all times urge the brush into engagement with the commutator to establish good electrical contact therewith regardless of wear on the brush.

Each of the brushes is substantially square in cross section except for a small cylindrical portion 16 at its outer (anti-commutator) end which serves as a pilot for the inner end of the brush spring and, at its junction with the square main body portion of the brush, defines a shoulder against which the innermost coil of the spring is received.

The brush holders are mounted on a flat insulative mounting plate 18 (of fiber, laminated Bakelite, or the like) which is secured to a pair of pads 19 projecting inwardly from the end wall of the motor housing adjacent to the commutator. Screws 20 pass through holes 21 in the plate and thread into tapped holes in the pads to mount the plate thereon with its surfaces normal to the armature axis and with the outer end portion of the commutator projecting through a medial aperture 22 in the plate.

Each of the brush holders comprises only two simple stampings, namely a channel-shaped receptacle 23 and a U-shaped cap or clip 24 of spring material. Each channel-shaped receptacle cooperates with the insulative plate 18 to define an open ended tube in which a brush is endwise slidably mounted, as will be seen presently; and the receptacles are therefore stamped or otherwise formed from conductive material, such as brass, and the inside widths of the web 26 and flanges 27 of the receptacle substantially correspond to the transverse dimensions of the brushes so that the latter may slide freely in the tubes.

A pair of integral mounting lugs 28 and 29 on each receptacle, one projecting from the free longitudinal edge of each flange 27 thereof, provides for securement of the receptacle to the mounting plate 18. These lugs pass through slots 28' and 29', respectively, in the mounting plate, and are bent over, at right angles to the flanges, to overlie the rear face of the mounting plate, as best seen in Figure 2. Since the flanges 27 are somewhat longer than the lugs 28 and 29 which project from them, the longitudinal edge portions of the flanges at each side of the lugs provide shoulders 30 which abut the front face of the mounting plate when the receptacle is mounted thereon, so that when the lugs 28 and 29 are bent across the rear face of the plate, the plate is securely clamped between the lugs and the shoulders 30. The channel-shaped portion of the receptacle thus cooperates with the plate to define a brush holder tube, one wall of which is defined by the front face of the mounting plate, the opposite wall being provided by the web 26 of the channel, which is spaced from the mounting plate and parallel thereto; and the remaining pair of opposite walls are defined by the flanges 27.

The slots 28' and 29' in the mounting plate are so disposed with respect to its medial aperture 22 that the brush holder tube is held with its axis radial to said aperture, and therefore, of course, radial to the commutator, to thus present the brush in the usual relation to the commutator.

The lug 28 on one of the flanges is made relatively narrow to accommodate another lug 31 on said flange while retaining the shoulders 30 at the ends thereof. This latter lug 31 projects straight through the slot 28' in the mounting plate to provide a solder terminal by means of which a conductor 14 may be electrically connected to the receptacle, and to facilitate this connection a small hole 32 may be provided near the outer free end of this lug. In this respect it should be noted that the mounting plate is irregular in outline to provide spaces between its edges and the wall of the motor housing through which the conductors 14 pass, as well as to permit the flow of cooling air through the motor.

The inner end of each of the brushes, of course, projects from the inner end of its brush holder tube, but the outer end of each tube must be closed to receive the reaction of the brush springs 15. This latter function is accomplished by means of a U-shaped cap or clip 24 engaged over the outer end and the sides of the tube. The clip 24 is stamped or otherwise formed from a single strip of resilient conductive material, such as Phosphor bronze. The width of this strip, which is preferably uniform throughout its length, is substantially equal to the inside width of the flanges. The bight 33 of the clip is substantially straight and disposed flatwise across the anti-commutator end of the tube, and its legs are likewise substantially straight but biased toward one another into firm flatwise clamping engagement with the outer surfaces of the flanges of the channel. This firm engagement of the legs of the clip with the flanges of the channel enables current from the conductor 14 to be conducted to the clip and thence, through the brush spring (the outermost coil of which seats against the bight of the clip), to the brush.

To facilitate flexure of the legs with respect to the bight, they are joined thereto by an outwardly bowed portion 34 of relatively small radius; and the free outer end portions of the legs are bent outwardly, as at 35, to enable them to cam themselves outwardly on the ends of the flanges as the cap is slid into place on the tube.

A small tang 36, struck inwardly from the medial portion of each leg of the clip, provides one element of a unidirectional detent-like latch whereby the cap is prevented from being displaced lengthwise of its legs outwardly off of the tube, the other detent element comprising a circular aperture 38 in each flange. The free edge portion of the tang, which is nearest the bight of the clip, is sheared inwardly and rounded, and as viewed in longitudinal section (see Figure 4) the tangs converge toward the bight of the clip so that their inwardly directed free edge portions define shoulders 37 facing the bight, while the remainders of the tangs merge into their legs. The circular aperture 38 in each flange of the receptacle has substantially the same radius as the free edge of the adjacent tang, and the tangs engage in these apertures to define unidirectional locking detents. The edge portions of the apertures which are nearest the outer end of the brush tube form shoulders which abut the shoulders 37 of the tangs when the detents are engaged to thereby preclude lengthwise outward displacement of the clip off of the tube, unless the legs of the clip are deliberately spread apart, away from the apertured sides of the tube and against their normal bias, to disengage the tangs from the apertures. The engagement of the bight of the clip with the ends of the flanges at the outer end of the tube, of course, precludes inward lengthwise displacement of the clip.

As already noted, the cap may be readily slid into place on the receptacle since the outwardly bowed free end portions 35 of the legs cam the legs apart at the ends of the flanges to enable them to straddle the apertured sides of the receptacle, and it will be seen that the tangs likewise cam themselves over the flanges by reason of their outward longitudinal convergence. It will also be noted that the tangs tend to center themselves in the apertures 38 by reason of the fact that both have mating rounded shoulder portions.

However, because the cooperating detent-like members are rounded, the cap might normally rock about the pivot defined by them. To some extent such rocking displacement is precluded by virtue of the fact that the detent members are situated intermediate the ends of the legs of the cap, and the front longitudinal edges of the legs abut the mounting plate 18 along their entire lengths. Some further degree of assurance against such rocking displacement is provided by the snug engagement of the flat bight of the cap across the straight ends of the flanges when the cap is installed on the receptacle and the detents are engaged. However, absolute assurance against sidewise or rocking displacement of the cap is afforded by a lug-like extension 40 on the anti-commutator end of the web 26 which overlies the adjacent edge of the bight of the cap, so that the bight is confined edgewise between said lug and the front surface of the mounting plate and thus positively precludes rocking of the clip or cap about the detent members.

From the foregoing description, taken together with the accompanying drawings, it will be readily apparent that this invention provides an unusually simple brush holder compromising a relatively few inexpensive stampings and characterized by a clip-type cap for closing the anti-commutator end of the brush holder tube, which cap, by reason of a unidirectional detent-like latch connection with the tube, is not susceptible to accidental displacement therefrom, but may nevertheless be readily removed from the tube to permit access to the brushes.

What we claim as our invention is:

1. A brush holder for mounting a brush of an electric motor in cooperative relationship with the commutator of the motor, comprising: an insulative member adapted to be mounted on a stationary part of the motor adjacent to the commutator with a flat surface of the member normal to the commutator axis; a conductive substantially channel-shaped brush receptacle fixed on said member with its web spaced from said surface and its flanges extending toward the same, said receptacle cooperating with said surface of the member to define a tubular brush holder adapted to have its axis radial to the commutator, and in which a brush is adapted to be endwise slidably mounted; a substantially U-shaped spring clip having its legs embracing and biased into clamping engagement with the flanges of the brush receptacle and its bight disposed across the open end of the tubular brush holder which is adapted to be located remote from the commutator, to close said remote end of the brush holder and thereby preclude endwise displacement of a brush in the brush holder out of said remote end thereof; and cooperating detent-like locking means on the legs of the spring clip and on the sides of the brush holder provided by the flanges of the receptacle to preclude displacement of the clip lengthwise of the legs thereof off of said remote end of the brush holder, said detent means being held interengaged by the force biasing said legs of the clip into engagement with the receptacle flanges, and the part thereof on the clip being spaced intermediate the ends of the legs of the clip; and the legs of the clip having edge portions adjacent to the ends thereof abutting said surface of the insulative member to preclude rocking displacement of the clip about said detents.

2. Means for mounting the brushes of a small electric motor in cooperative relationship to the commutator of the motor, comprising: a flat plate of insulative material having a medial aperture through which the commutator is adapted to project; a pair of elongated electrically conductive brush holders mounted on said plate at one face thereof, at diametrically opposite sides of the aperture therein, and in endwise alignment with one another, each of said brush holders comprising a channel-shaped receptacle formed of sheet metal and having spaced apart flanges perpendicular to and in edgewise abutting relationship with said face of the plate, and a web joining said flanges and held in spaced parallel relationship to said face of the plate by the flanges, the flanges and the web cooperating with said face of the plate to provide a tubular brush holder; lugs on the flanges projecting through slots in the plate and bent over against the opposite face of the plate to secure the receptacle to the plate; a U-shaped spring clip engaged over the end of the receptacle remote from the aperture in the plate, said clip being formed from flat resilient electrically conductive strip material, and having its legs overlying the flanges of the receptacle and biased toward one another so as to yieldingly clamp the flanges therebetween, and having its bight engaged with and extending across said remote end of the receptacle to close the same; and cooperating means on each leg of the clip and the flange engaged thereby defining a unidirectional detent-like latch to positively preclude displacement of the clip from said remote end of the receptacle, said detent-like latches being held operative in consequence to the bias on the legs of the clip but being readily disabled by spreading of the legs of the clip to enable detachment of the clip off of said remote end of the receptacle; and the legs of the clip having edge portions engaging said face of the plate to restrain rocking of the clip about the detent-like latches.

3. The brush holder set forth in claim 1 further characterized by the provision of an extension projecting from the web of the receptacle at said remote end of the brush holder engaged over the bight of the clip to hold the bight against said surface of the insulative member.

WILLIAM PAUL LUTHER.
GEORGE RUDAT.

REFERENCES CITED

The following references are of record in the file of this patent:

UNITED STATES PATENTS

| Number | Name | Date |
|---|---|---|
| 747,696 | Geisenhoner | Dec. 22, 1903 |
| 1,435,209 | Chantemerle | Nov. 14, 1922 |
| 1,761,066 | Bindschedler | June 3, 1930 |

FOREIGN PATENTS

| Number | Country | Date |
|---|---|---|
| 188,895 | Great Britain | Oct. 10, 1922 |
| 197,501 | Great Britain | May 17, 1923 |
| 42,250 | Denmark | May 19, 1930 |